(12) United States Patent
Godoy

(10) Patent No.: US 6,722,819 B2
(45) Date of Patent: Apr. 20, 2004

(54) DEVICE FOR OPERATING INFLATION AND DEFLATION VALVES OF AN AIR CHAMBER OF A SCUBA DIVER'S BALANCING JACKET

(75) Inventor: Carlos Godoy, Genoa (IT)

(73) Assignee: Cressi-Sub S.p.A., Genoa (IT)

( * ) Notice: Subject to any disclaimer, the term of this patent is extended or adjusted under 35 U.S.C. 154(b) by 0 days.

(21) Appl. No.: 10/160,391

(22) Filed: Jun. 1, 2002

(65) Prior Publication Data
US 2002/0182013 A1 Dec. 5, 2002

(30) Foreign Application Priority Data

Jun. 1, 2001 (IT) .................. FI20010046 U
Jul. 18, 2001 (IT) .................. FI20010060 U

(51) Int. Cl.7 ............................. B63C 11/08
(52) U.S. Cl. .................. 405/186; 114/315; 441/96; 441/108
(58) Field of Search .................. 405/185, 186; 2/2.15; 114/315; 441/90, 92, 96, 106, 108

(56) References Cited

U.S. PATENT DOCUMENTS

| 119,210 A | 9/1871 | Wilson |
|---|---|---|
| 836,524 A | 11/1906 | Morrell |
| 1,285,741 A | 11/1918 | Konopski |
| 2,593,988 A | 4/1952 | Cousteau |
| 3,064,287 A | 11/1962 | Maholm |
| 3,487,647 A | 1/1970 | Brecht, Jr. |
| 3,536,071 A | 10/1970 | Ferrando |
| 3,720,208 A | 3/1973 | Aldrich et al. |
| 3,727,250 A | 4/1973 | Koehn et al. |
| 3,747,139 A | 7/1973 | Braly |
| 3,866,253 A | 2/1975 | Sinks et al. |
| 3,898,705 A | 8/1975 | Schuler |
| 3,964,266 A | 6/1976 | Bartlett |
| 4,000,534 A | 1/1977 | Cerniway et al. |
| 4,016,616 A | 4/1977 | Walters |
| 4,045,835 A | 9/1977 | Flam et al. |
| 4,054,132 A | 10/1977 | Deeds |
| 4,068,657 A | 1/1978 | Kobzan |
| 4,114,389 A | 9/1978 | Bohmrich et al. |
| 4,137,585 A | 2/1979 | Wright, III |
| 4,227,521 A | 10/1980 | Hart et al. |
| 4,242,769 A | 1/1981 | Rayfield et al. |
| 4,379,656 A | 4/1983 | Darling |
| 4,437,790 A | 3/1984 | Trop |
| 4,523,914 A | 6/1985 | Faulconer et al. |
| 4,529,333 A * | 7/1985 | Robinette .................. 405/186 |
| 4,681,552 A | 7/1987 | Courtney |
| 4,720,281 A | 1/1988 | Matsuoka |
| 4,752,263 A | 6/1988 | Pritchard et al. |
| 4,779,554 A | 10/1988 | Courtney |
| 4,810,134 A | 3/1989 | Eaulconer et al. |
| 4,913,589 A | 4/1990 | Faulconer et al. |

(List continued on next page.)

FOREIGN PATENT DOCUMENTS

DE 2949402 6/1980
JP 1218996 A 9/1989

OTHER PUBLICATIONS

Sherwood Freedom Brand Buoyancy Compensator Sales Brochure (undated).

Primary Examiner—Heather Shackelford
Assistant Examiner—Sunil Singh
(74) Attorney, Agent, or Firm—Steinberg & Raskin, P.C.; Grant E. Pollack

(57) ABSTRACT

A device is provided for operating inflation and deflation valves of an air chamber of a scuba diver's balancing jacket. The device comprises inflation and deflation valves and a push-button for operating the valves that can be controlled by the diver. The device also has a handgrip projecting forwardly from a side position on a lower edge of the jacket, the push-button being situated on the handgrip.

11 Claims, 4 Drawing Sheets

U.S. PATENT DOCUMENTS

| | | |
|---|---|---|
| 4,986,700 A | 1/1991 | Takeda |
| 5,159,961 A | 11/1992 | Snetting et al. |
| 5,221,161 A | 6/1993 | Toy |
| 5,256,094 A * | 10/1993 | Canna .................. 441/96 |
| 5,520,485 A * | 5/1996 | Hermansen ............. 405/186 |
| 5,607,258 A | 3/1997 | Eungard |
| 5,620,282 A | 4/1997 | Stinton |
| 5,707,177 A | 1/1998 | Lehrer et al. |
| 5,788,415 A * | 8/1998 | Chen .................. 405/186 |
| 5,980,158 A | 11/1999 | Griffiths et al. |
| 6,039,043 A | 3/2000 | Graber et al. |
| 6,546,561 B2 | 4/2003 | Duhamell |
| 2002/0057946 A1 * | 5/2002 | Beltrani .............. 405/186 |

* cited by examiner

DEVICE FOR OPERATING INFLATION AND DEFLATION VALVES OF AN AIR CHAMBER OF A SCUBA DIVER'S BALANCING JACKET

FIELD OF THE INVENTION

The present invention relates generally to equipment for use in limited oxygen environments or the like and, more particularly, to a device for operating inflation and deflation valves of an air chamber of a scuba diver's balancing jacket.

BACKGROUND OF THE INVENTION

The use of balancing jackets to enable the scuba diver to assume a vertical position is well known in the sector of underwater activities. These jackets contain an air chamber that can be inflated to facilitate upward moves of the diver and deflated to accelerate his descent. The jacket is inflated by using the air contained in the cylinders forming part of the diver's equipment, the diver opening an appropriate valve for this purpose. The air release from the jacket, on the other hand, is brought about by the external pressure when the diver opens one or more discharge valves.

Traditional solutions of this problem see the jacket provided with a corrugated conduit, generally a tube of considerable flexibility, starting from the upper part of the jacket and provided at its free end with means for operating both the inflation and the deflation valves. The tube has a length of several tens of centimeters and is left to fluctuate around the diver. Whenever the diver wishes to change his vertical position, he can get hold of the end of the tube and operate the particular control that will bring about the desired volume change of the air chamber of his jacket.

It should here be borne in mind that a deflation of the jacket will diminish the diver's buoyancy and will therefore cause him to descend to a greater depth. As a general rule, this descent, which takes place rather slowly, does not imply any particular risks for the diver and the discharge valve can therefore be operated with relative freedom. The inflation of the jacket's air chamber, on the other hand, calls for greater attention, since an excessive air inflow and a corresponding increase of the diver's buoyancy will cause therefore a rapid upward movement with dangerous consequences for the diver.

Given this situation, the appropriate instruction manuals tell the diver that, on getting hold of the corrugated conduit of the conventional type, he should pull it upwards when he wishes to rise towards the surface and pull it downwards when he wishes to descend further: in this way he will reduce the possibility of operating the wrong valve and the dangerous consequences that could stem therefrom, especially in emergency conditions.

According to the conventional solution, inflation of the jacket is obtained by operating a push-button situated at the end of the corrugated conduit, while deflation is produced by means of one or more of the following procedures: pulling the conduit away from the body, pressing of a push-button, pulling a small cord that projects from the jacket. In each case, however, the diver must first find the operating means and this obliges him to make a more or less extensive movement or displacement of his arm.

According to a previous patent of the same applicant, the air chamber of the jacket is provided with a multiplicity of discharge valves and when the jacket has to be deflated, these can be opened simultaneously thanks to mechanical connection means that can be operated in the vicinity of the discharge valves, generally situated at the top side and bottom side of the jacket. In this way the diver can operate all these valves at the same time, choosing the position he finds most comfortable according to the position of his hand.

OBJECTS AND SUMMARY OF THE INVENTION

The object of the present invention is to provide a device for operating the inflation and deflation valves positioned in such a way that, no matter what may be the position of the diver's hand, it will be instinctive for him to place it onto the proposed device.

Another aim of the present invention is to provide a device of the aforementioned type provided with means that the diver can operate to control the valves of his jacket and therefore comprising means that will transmit the operating command to the various valves, said transmission means being realized in such a manner as to assure the greatest possible constructional simplicity and therefore also the greatest possible certainty of proper operation.

According to the invention, the inflation and deflation valve operating device of the jacket is constituted by a handgrip that projects from the bottom portion of the jacket at a lateral/front position thereon. It can therefore be reached by just a slight bending of the diver's arm to bring his hand close to his hip, which is also the position where his jacket terminates.

Furthermore, using underwater goggles with downward-pointing lenses as envisaged by a previous invention of the same applicant, said handgrip will also be perfectly visible for the diver.

Said handgrip is of such size as to completely fill the diver's hand, so that even when he is wearing gloves, it will be easy for him to grip it and operate the means for controlling the inflation or deflation of the jacket without being left in doubt as to whether or not he has operated them, said means being realized in such a manner as to make the diver perform the correct operation on each occasion. The position of the handgrip, which projects from a small sleeve attached to the jacket, is such that, whenever the diver gets hold of it, his forearm will be bent slightly forward and downward. This relative position helps the diver to make the correct choice between the inflation and deflation controls of the jacket.

According to a preferred embodiment of the invention, the upper surface of the handgrip is provided with a sliding push-button or cursor that can be pushed forward and then slightly downwards by means of a movement of the thumb. When the diver uses his thumb to push said cursor forward and then downward, be it even slightly, he causes the discharge valve or valves of his jacket to open and this, in turn, will diminish his buoyancy and thus cause him to descend further into the water.

For the purpose of opening the inflation valves of the jacket, the handgrip is provided with a push-button on the side of its internal face that can be operated with the diver's index finger or, better, his middle finger. This operation, though just as easy as the previous one, requires the diver to consciously search for the inflation button and therefore avoids untimely operation that could have dangerous consequences.

Both the deflation cursor and the lateral inflation button are provided with elastic means to bring them back into their original positions.

According to another particularly preferred feature of the invention, the handgrip comprises means of the mechanical type to transmit the operating command to the deflation valve, said sliding push-button being connected to the mobile shutter of the deflation valve by means of a kinematic motion mechanism consisting of a piston and a control cable. The means for transmitting the operating command to the inflation valve, on the other hand, are of the pneumatic type and take the form of a pneumatic circuit that is activated by a pilot valve operated by the aforesaid lateral push-button.

BRIEF DESCRIPTION OF THE DRAWINGS

Other characteristics and advantages of the operating device in accordance with the present invention will emerge more clearly from the following description of a particular embodiment thereof, which is to be considered as an example and not limitative in any way, said description making reference to the attached drawings of which.

DETAILED DESCRIPTION OF THE PREFERRED INVENTION

Figure 1:
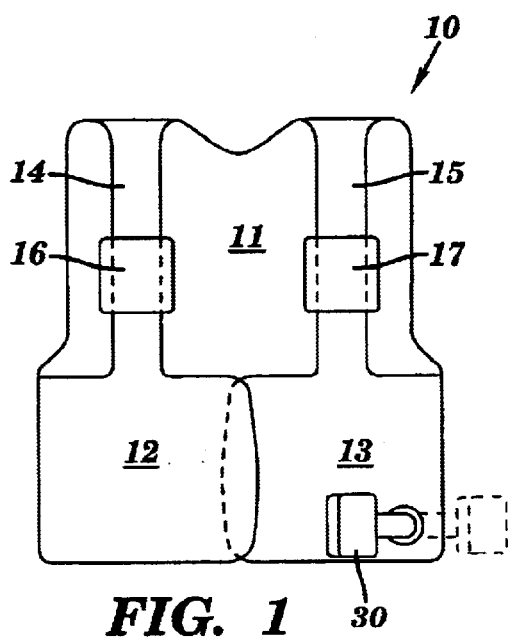
FIG. 1 shows a schematic front view of a jacket for scuba divers provided with an operating device in accordance with the invention.
Figure 2A:
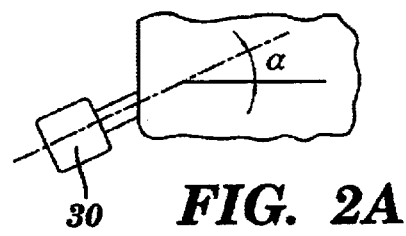
FIG. 2A is a partial view of the jacket with the handgrip of the operating device in an angularly displaced position.
Figure 2:
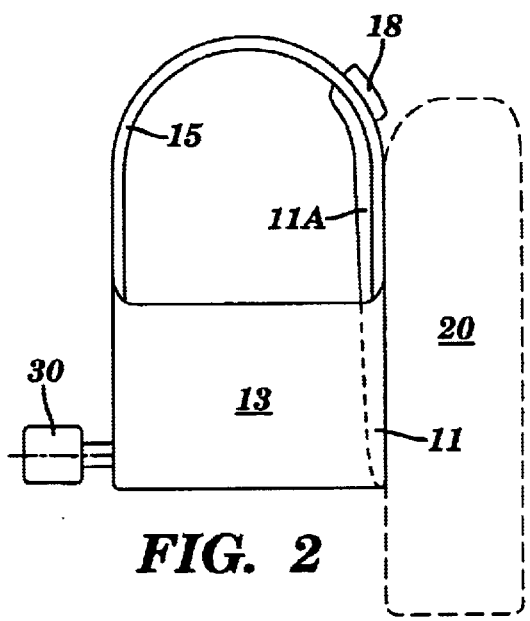
FIG. 2 shows a side view of the same jacket.

Referring to FIGS. 1 and 2, the reference number 10 indicates a jacket for a scuba diver, here illustrated only schematically, complete with a back part 11 that contains the greater part of the compensating air chamber 11A, which may also extend into the front parts of the jacket. The front parts are formed by two portions 12 and 13, respectively right and left, and are provided with closure means not shown on the drawing. Front parts 12 and 13 are connected to back part 11 by means of shoulder parts 14 and 15, schematically shown on the drawing in the form of straps, which are provided with means 16 and 17 for regulating their length. However, the front parts of the jacket may also assume any other appropriate shape.

Air chamber 11A of the jacket is provided in a known manner with one or more discharge valves, indicated in FIG. 2 by the reference number 18. The jacket's air chamber is also provided with means for feeding the pressurized air from cylinders 20, which are of a conventional type, said means comprising a conduit (not shown) and a valve to control the inflow of the pressurized air from cylinder 20, that will be described further on.

According to the invention, the controls of the discharge valve and the inflation valve are arranged on a handgrip 30 projecting from one of the front parts 12 or 13 in a side position thereof. Consequently, handgrip 30 can be readily gripped by the diver's hand when his forearm is bent slightly forwards, which is an altogether natural position.

Figure 3:
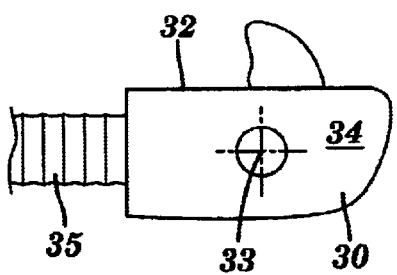
FIG. 3 shows an elevation of the internal face of the handgrip.
Figure 4:
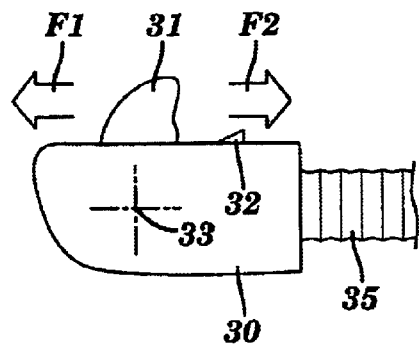
FIG. 4 shows an elevation of the external face of the same handgrip.

As shown in FIGS. 3 and 4, handgrip 30 is provided with a push-button 31 that can slide on its upper face 32 and controls the opening of the jacket's deflation valve 18. This button has to be pushed forward in the direction of arrow F1 and will then return elastically into it closure position in the direction of arrow F2. A second push-button 33 is situated laterally on the internal face 34 of handgrip 30: the pressing of this button causes the inflation valve to open. This push-button is once again provided with elastic return means that will be described in greater detail further on.

Figure 5:
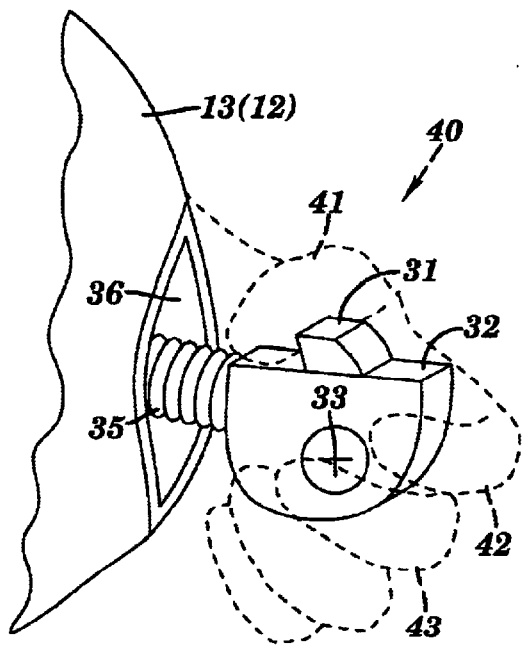
FIG. 5 shows a perspective view of the handgrip where the position of the fingers of the diver's hand when he grips it is also shown.

As shown in FIG. 5, handgrip 30 is connected to a flexible tube 35 that, passing through an appropriate opening 36, protrudes from jacket 10. Tube 35 contains the mechanical means that control the opening of the deflation valve.

The size of handgrip 30 is such that it can readily be clasped by the diver's hand and, more particularly, its upper edge is of such length as to permit the thumb of the diver's hand to be placed between the rear edge of the handgrip and the sliding push-button, while the height of the handgrip is such that the index finger and the middle finger of the diver's hand come to be situated in the vicinity of the push button on its side.

FIG. 5 also shows the manner in which the diver's hand 40 clasps handgrip 30 and the position in which his fingers will naturally come to find themselves. The thumb 41 rests on the upper part 32 of handgrip 30 and in contact with the sliding push-button 31 that, on being pushed forward, will cause the jacket to deflate. The position of the handgrip at the lower edge of the jacket ensures that the diver's forearm will come to have a slight downward inclination and will therefore displace the axis of the flexible tube and the handgrip in the same direction (see FIG. 2A). The diver will automatically associate this slight downward inclination with the descent direction and the direction in which he/she has to move the sliding push-button 31.

Operation by means of the thumb is therefore automatic and instinctive. The pressing of push-button 33 on the side of the handgrip by means of the index finger or the middle finger is just as simple, but calls for a conscious positioning of the finger on push-button 33. That is very important, because—as has already been noted—an undesired and uncontrolled filling of the jacket can cause a rapid rise to the surface with all the risks associated with such an event.

According to the invention, therefore, the handgrip is provided with two operating buttons that simply cannot be confused, even though both of them are arranged in a position that can easily be reached by the diver's hand.

Figure 6:
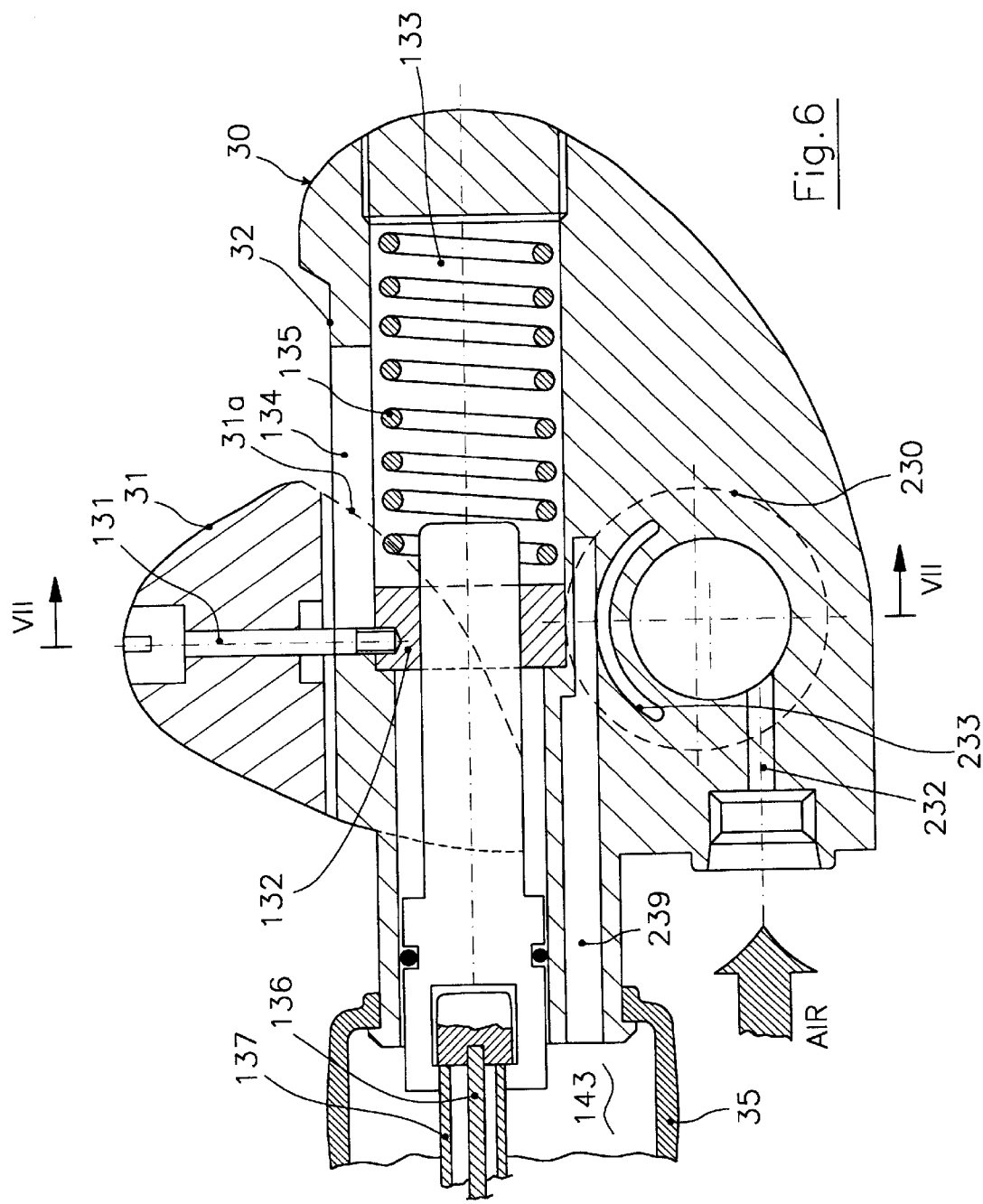
FIG. 6 shows a schematic longitudinal cross section through the handgrip in accordance with the invention.
Figure 7:
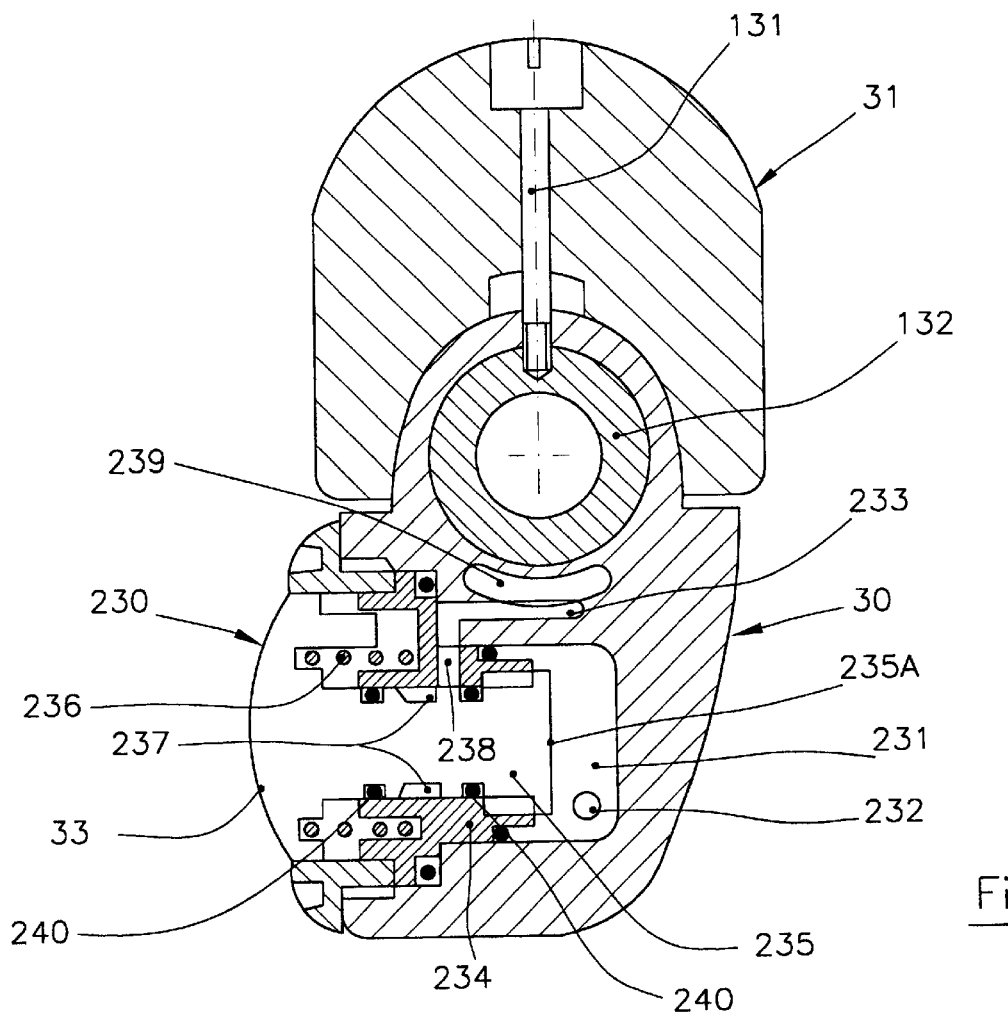
FIG. 7 shows a schematic cross section through the handgrip on the line of the arrows VII—VII of FIG. 6 with the inflation valve of the jacket in its closed position.

Referring now to FIGS. 6 and 7, a connecting rod 131 rigidly attaches the sliding button 31 to a piston 132 that can slide inside a cylindrical chamber 133 formed inside handgrip 30. A slot 134 permits connecting rod 131 to pass through the upper face 32 of handgrip 30 above cylindrical chamber 133. A spring 135 situated between the bottom of chamber 133 and piston 132 will always bring the piston back to its rearward rest position as soon as the diver's thumb ceases to exert pressure on sliding button 31.

Figure 8:
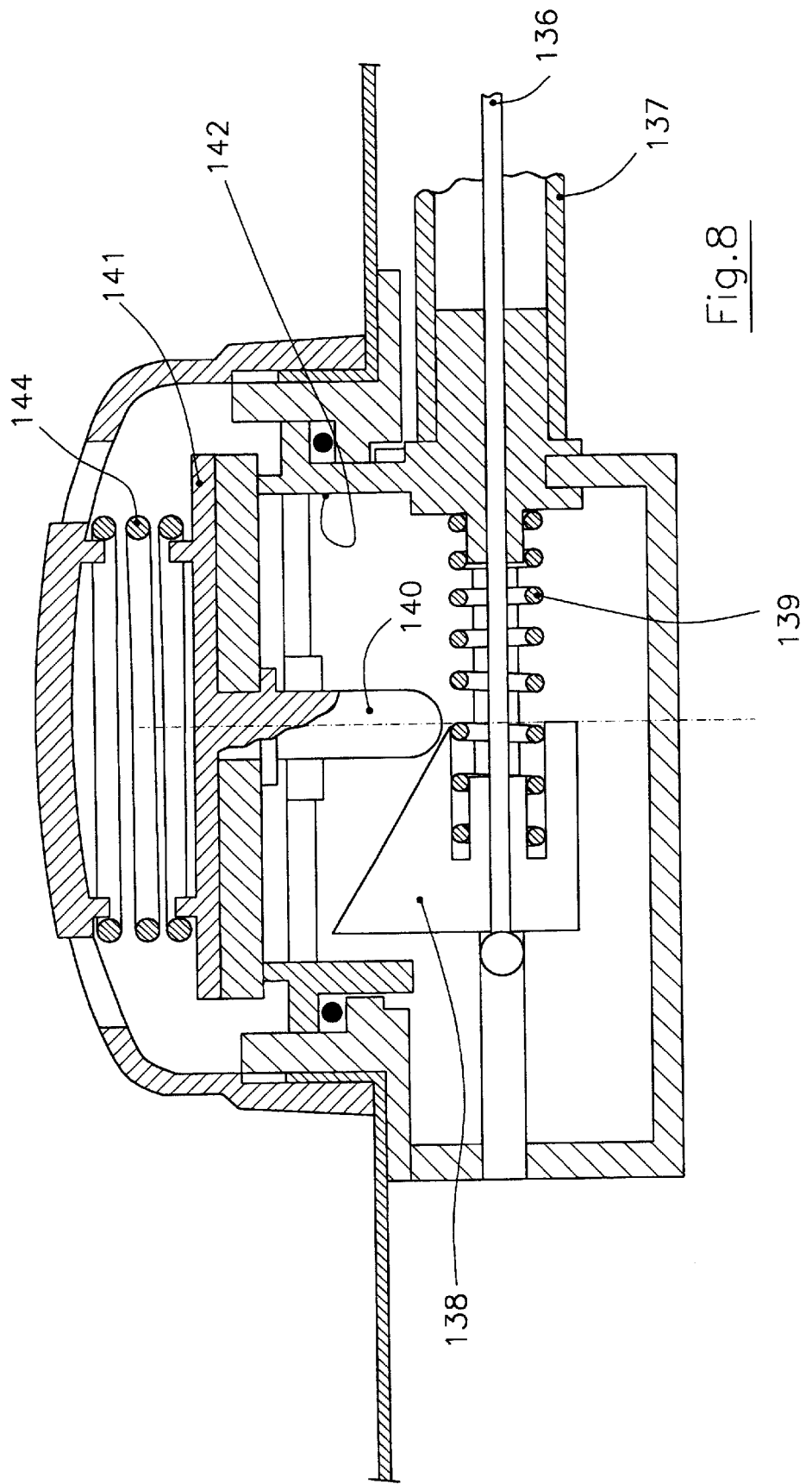
FIG. 8 shows a diametral section through a discharge valve of the jacket air chamber with the associated means for transmitting the operating command in accordance with the invention.

Piston 132 is connected to a flexible cable 136 enclosed in a sheath 137. With particular reference to FIG. 8, which shows a diametral section through the discharge valve 18 of the jacket's air chamber, it can be seen that a forward movement of piston 132 will displace a cam 138 inside valve 18 against the return action of a spring 139. The displacement of cam 138 lifts a shank 140 projecting from disk-shaped shutter 141 resting on seating 142 of discharge valve 18. Disk-shaped shutter 141 is normally pushed against its seating by a spring 144. Cam 138 is brought back to its rest position by a spring 139 and by spring 135 that, as previously explained, acts directly on piston 132.

Springs 135 and 139 therefore assure that sliding button 31 will return to its rest position as soon as the diver's thumb ceases to press it. The discharge valve of the jacket's air chamber is therefore controlled by means of a linkage of a mechanical type.

For the purposes of inflating the air chamber of the jacket, on the other hand, it can be seen from FIG. 7 that a pneumatic valve 230 is provided within handgrip 31, said valve being normally kept in its closed position by the pressure of the air cylinders carried by the diver. The valve comprises a pressurized chamber 231 that communicates with the cylinders through a passage hole 232 and a feed tube, not shown, and a feed chamber 233. The two chambers are separated by a flanged bushing 234 within which there is mounted a sliding pilot piston 235, one end of which, the so-called inner end 235A, is situated within the pressurized chamber 231, while its other end projects outside handgrip 30 and is constituted by push-button 33.

Feed chamber 233 communicates with the inside 143 of the jacket's air chamber by means of a feed conduit 239 formed within handgrip 31, and tube 35.

Pressurized chamber 231 is normally kept separated from feed chamber 233 by pilot piston 235, on the surface of which there is provided an annular throat 237 delimited by two O-rings 240. Flanged bushing 234 is provided with a radial passage 238 that leads into feed chamber 233.

When pilot piston 235 is in its closure position, which is the position shown in FIG. 7, feed chamber 233 and pressurized chamber 231 do not communicate with each other. When push-button 33 is pressed by the diver in order to bring pressurized air into the jacket's air chamber, pilot piston 235 is pushed into pressure chamber 231, overcoming the pressure exerted on its end, and annular throat 237 thus comes to communicate both with radial passage 238 and pressure chamber 231. This means that pressure chamber 231 now communicates with feed chamber 233 and the air chamber of the jacket will therefore become inflated.

As soon as the diver stops pressing button 33, the valve will automatically close on account of the force that the pressure in pressure chamber 231 exerts on the end 235A of pilot piston 235. A spring 236 (FIG. 7) assists the return of piston 235 for the sole purpose of enhancing the safety margin assuring the proper functioning of the valve. To all intents and purposes, therefore, pilot piston 235 behaves like a slide valve.

It should be noted that in accordance with the invention, the action that triggers the deflation of the air chamber is transmitted by means that are mechanical in nature. In fact, the push-button (in this case a sliding cursor) moves a tie rod and this, in its turn, moves a cam that lifts the shutter of the air chamber deflation valve. It is therefore the mechanical force provided by the operator that controls the opening of the valve. Once the operator's control action ceases, the valve is closed again by mechanical return means (springs) in which the force applied by the operator had stored the elastic energy needed to bring the parts back to their rest position.

According to the invention, moreover, whenever the air chamber has to be inflated, the diver's action is transmitted to the inflation valve by means that are pneumatic in nature. In fact, a push-button displaces a pilot piston, thus causing a pressure chamber to communicate with a feed chamber. The operator has to do no more than provide the energy needed to shift the slide valve constituted by the pilot piston. The energy need to close the valve is provided by the pressurized fluid as soon as the push-button ceases to be maintained in its depressed position.

Advantageously, lower front edge 31*a* of push-button 31 will be of an arcuate shape that follows a corresponding guide profile 30*a* formed laterally on the rear of handgrip 30.

Various modifications and alterations to the present invention may be appreciated based on a review of this disclosure. These changes and additions are intended to be within the scope and spirit of this invention as defined by the following claims.

What is claimed is:

1. A device for operating inflation and deflation valves of an air chamber of a scuba diver's balancing jacket, the device comprising:

an actuator that permits the diver to operate the valves; and a handgrip projecting forwardly from a lower edge of the jacket at a side position, the actuator being situated on the handgrip, and the handgrip having a first sliding push-button that slides along the upper face of the handgrip for controlling the opening of the deflation valve, and a second push-button on its inner side face for controlling the opening of the inflation valve.

2. The device set forth in claim 1, wherein the handgrip is connected to the jacket by a generally flexible tube, the tube including the actuator controlled by the first and second push-button.

3. The device set forth in claim 1, wherein the actuator comprises a mechanical transmission link for operating the deflation valve and a pneumatic transmission device for operating the inflation valve.

4. The device set forth in claim 3, wherein the mechanical link comprises a kinematic chain for transmitting the diver's operating action to the deflation valve that renders the first push-button integral with a valve shutter.

5. The device set forth in claim 4, wherein the kinematic chain comprises a relatively rigid connector between the first push-button and a piston mobile inside a chamber formed within the handgrip, the piston being connected to the shutter of the deflation valve through a relatively flexible, but generally non-extensible link.

6. The device set forth in claim 5, wherein the relatively flexible, but generally non-extensible link is connected to a cam capable of lifting the shutter of the deflation valve by acting on a shank projecting from the shutter, a relatively elastic article being provided for returning the shutter to its closing position.

7. The device set forth in claim 3, wherein the pneumatic device for transmitting the operating action to the inflation valve comprises a pilot piston acting as a sliding valve, integral with the second push-button and movable within a flanged bushing situated between a pressure chamber connected to pressurized cylinders and a feed chamber connected to the air chamber of the jacket, passage conduits being provided in the pilot piston and the flanged bushing such that, when the second push-button is pressed and the piston is integrally moved with it, the conduits cause the pressure chamber to communicate with the feed chamber.

8. The device set forth in claim 7, wherein the end of the piston opposite the second push-button projects into the pressure chamber, the piston having an annular throat such that, when the second push-button is pressed, the throat is placed in communication with both the passage conduit formed in the bushing and the pressure chamber, the passage conduit being generally radial in shape and in relatively permanent communication with the feed chamber.

9. The device set forth in claim 1, wherein the size of the handgrip is such as to fit within the diver's hand.

10. The device set forth in claim 1, wherein an upper edge of the handgrip is of such a length as to permit the thumb of the diver's hand to be placed between its rear edge and the first sliding push-button, the height of the handgrip also being such as to permit the diver's index finger and middle finger to be placed in the relatively immediate vicinity of the second push-button.

11. A device for operating inflation and deflation valves of an air chamber of a scuba diver's balancing jacket, the device comprising:

an actuator that permits the diver to operate the valves and a handgrip projecting forwardly from a lower edge of the jacket at a side position, the actuator being situated on the handgrip;

the handgrip having a first sliding push-button arranged on its upper face and a second push-button arranged on its inner side face, the first push-button controlling the opening of the deflation valve and the second push-button controlling the opening of the inflation valve;

the actuator including a mechanical transmission link for operating the deflation valve and a pneumatic transmission device for operating the inflation valve;

the mechanical link comprising a kinematic chain for transmitting the diver's operating action to the deflation valve that renders the first push-button integral with a valve shutter;

the kinematic chain having a relatively rigid connector between the first push-button and a piston mobile inside a chamber formed within the handgrip, the piston being connected to the shutter of the deflation valve through a relatively flexible, but generally non-extensible link;

the link being connected to a cam capable of lifting the shutter of the deflation valve by acting on a shank projecting from the shutter, a relatively elastic article being provided for returning the shutter to its closing position; and the device further comprising relatively elastic return articles for the piston, for the relatively flexible, but generally non-extensible link, and for the cam.

* * * * *